No. 689,086. Patented Dec. 17, 1901.
W. J. INMAN.
FISH TRAP.
(Application filed May 14, 1901.)
(No Model.)
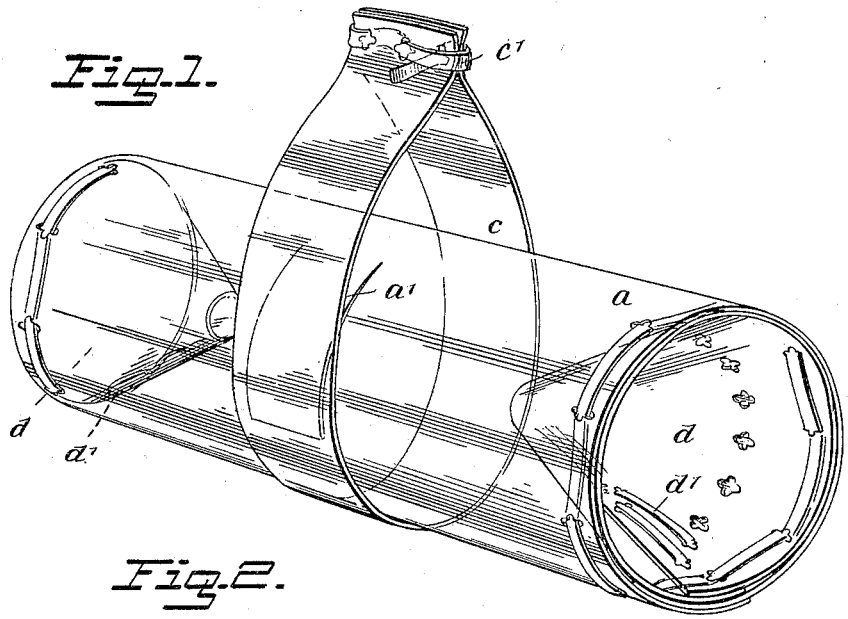
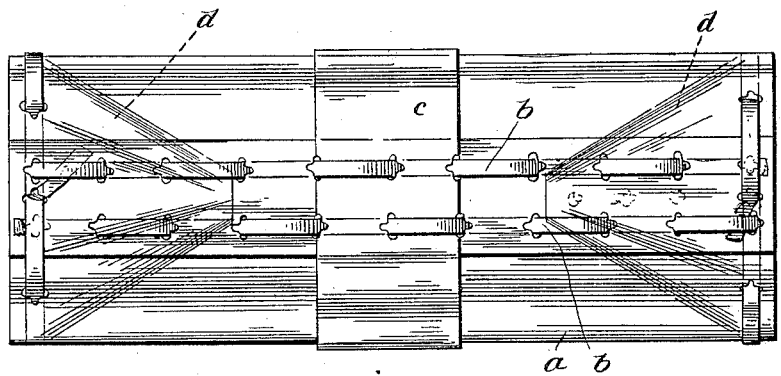
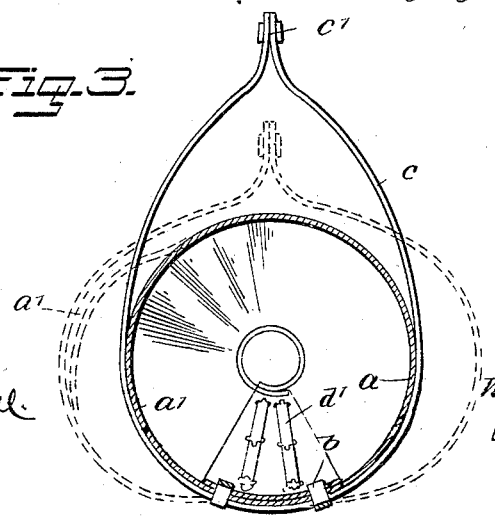
WITNESSES:
INVENTOR
William J. Inman
BY
ATTORNEYS

UNITED STATES PATENT OFFICE.

WILLIAM J. INMAN, OF RUSSELLVILLE, KENTUCKY.

FISH-TRAP.

SPECIFICATION forming part of Letters Patent No. 689,086, dated December 17, 1901.

Application filed May 14, 1901. Serial No. 60,133. (No model.)

*To all whom it may concern:*

Be it known that I, WILLIAM J. INMAN, a citizen of the United States, and a resident of Russellville, in the county of Logan and State of Kentucky, have invented a new and Improved Fish-Trap, of which the following is a full, clear, and exact description.

This invention relates to a fish-trap designed especially for catching bait and other small fish.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a perspective view of the invention. Fig. 2 is a bottom plan thereof, and Fig. 3 is a cross-section.

The trap is constructed of a flexibe transparent or semitransparent substance. The best material adapted for this purpose is sheet-celluloid. It is tough and not liable to breakage and being transparent it readily exposes the bait and is itself partly or wholly invisible, so that it does not frighten the fish as much as other material.

The trap has a cylindrical body portion $a$, formed of an integral piece of sheet-celluloid, rolled as indicated, and fastened by lacings $b$, which are also preferably of celluloid. The body portion $a$ is formed with a cut producing a tongue $a'$, which covers the opening by which the trap is emptied. The tongue $a'$ extends transversely to the axis of the body $a$ and tends by the spring properties of the celluloid to project outward, thus uncovering the opening. This tongue is normally held closed by a band $c$, which is formed of celluloid or some other flexible material and which incloses the body $a$ of the trap and lies around the tongue $a'$. The band $c$ is fastened at the bottom of the base $a$ by the lacings $b$, and its ends are fastened together by a lacing $c'$, said ends being laid with their inner side faces against each other, thus giving the band a tendency to assume the oblong position shown in Fig. 3. This results in exerting an inward pressure on the tongue $a'$ and keeping the same normally closed, as indicated in Fig. 3. By pressing down on the top of the band $c$ it will assume the form indicated by dotted lines in Fig. 3 and the tongue $a'$ will therefore be permitted to spring open, thus opening the trap.

The ends of the trap are closed by conical walls $d$, which are formed, preferably, of celluloid struck from an integral sheet and rolled into a proper form. The edges of these sheets are fastened together by lacings $d'$, similar to the lacings $b$. In applying the lacings $b$, $c'$, and $d'$ the celluloid is provided with orifices therein and the lacings are passed in and out of the orifices. If desired, the trap itself may be formed with orifices at various points to permit the circulation of the water freely through it, thus to convey the scent of the bait. This, however, is not an essential feature of my invention.

Having thus described my invention, I claim as new and desire to secure by Letters Patent—

1. A fish-trap having a flexible tongue tending to move outwardly, and a band held yieldingly against the tongue to hold it normally closed, the tongue being releasable in a manner such as specified.

2. A fish-trap, formed of a flexible transparent substance, such as celluloid, and comprising a body portion formed of a sheet rolled into cylindrical form, strips of flexible transparent material laced in the meeting edges of said sheet for fastening it, conical end sections formed of flexible transparent material rolled into conical form, said end sections being projected into the body, and flexible transparent strips laced between the larger peripheries of the end sections to the ends of the cylindrical body portion to secure said parts together.

In testimony whereof I have signed my name to this specification in the presence of two subscribing witnesses.

WILLIAM J. INMAN.

Witnesses:
W. D. MORROW,
C. W. ANDREWS.